United States Patent [19]
Brisebois

[11] 3,897,839
[45] Aug. 5, 1975

[54] SKI SNOW DEFLECTOR
[75] Inventor: Michel Brisebois, Roxton Falls, Canada
[73] Assignee: Bombardier Limited, Valcourt, Canada
[22] Filed: Nov. 15, 1974
[21] Appl. No.: 524,217

[30] Foreign Application Priority Data
May 15, 1974 Canada................................ 199960

[52] U.S. Cl................................... 180/5 R; 280/28
[51] Int. Cl.² ......................................... B62B 19/04
[58] Field of Search....................... 180/5 R; 280/28

[56] References Cited
UNITED STATES PATENTS
3,675,939  7/1972  Vik........................................ 280/28
3,817,544  6/1974  Labelle.................................. 280/28
3,856,318  12/1974  Hollenbeck.......................... 180/5 R Primary Examiner—Robert R. Song

[57] ABSTRACT
On the bottom of a snowmobile ski, adjacent a longitudinal edge, a snow deflection member is provided which deflects snow laterally of the ski and into the area of the snowmobile between the track and the suspension means to provide lubrication between these two surfaces and thereby reduce the friction.

12 Claims, 5 Drawing Figures

SKI SNOW DEFLECTOR

FIELD OF THE INVENTION

This invention relates to improvements in snowmobiles, and more particularly to an arrangement designed to improve the performance of a snowmobile suspension of the slide frame type.

DESCRIPTION OF THE PRIOR ART

Conventionally, snowmobile suspensions include suspension elements which resiliently support the rear portion of the snowmobile body upon the ground-engaging run of the snowmobile track belt. These suspension elements may be in the form of a series of rollers or bogie wheels in rolling engagement on the track belt, or in the form of slide frames in sliding engagement with the track belt. Various arrangements of snowmobile slide frame suspensions are known, and these generally comprise a pair of laterally spaced longitudinal slide rails having lower surfaces which are coated with a suitable low friction material such as nylon in sliding engagement with the track belt. The track belt is conventionally of fabric reinforced natural or synthetic rubber, and to reduce the frictional engagement between the belt and the slide rails, the latter may be arranged to run in engagement with metal cleats in the track belt. For example in one well known type of track belt, there are provided near its lateral edges, two longitudinally extending series of regularly spaced holes for engagement by the teeth of a sprocket drive means. To reduce wear on the belt, the leading and trailing edges of these sprocket holes are reinforced by C-shaped metal cleats secured thereto. The slide rails of the suspension unit are positioned to run in engagement with the limbs of these cleats on the inner side of the track belts. Alternatively, in track belts which do not have these sprocket holes but instead have driving means in the form of rows of lugs or teeth molded or otherwise provided on the internal track surface, the slide rails may be arranged to slide upon rows of metal bearing plates attached to the inner surface of the track.

While slide frame suspensions possess many desirable characteristics, they have the disadvantage that the low friction surface material of the slide rails tends to wear relatively rapidly and must be replaced. When a snowmobile is operated on soft powder snow there is always sufficient loose snow within the track belt to provide lubrication between the slide rails and the cleats or other bearing elements on the track belt. However, when the snowmobile operates on hard packed snow, or in ice, very little snow becomes entrained within the track belt, and this leads to overheating and wear of the surfaces of the slide rails.

SUMMARY OF THE INVENTION

To reduce this problem, the present invention provides a snowmobile ski with an upper surface adapted to be attached to a steering member and an underside comprising a longitudinal running surface, a snow deflection member positioned adjacent a longitudinal surface, a snow deflection member positioned adjacent a longitudinal edge of and projecting beneath said underside whereby in operation forward movement of said snowmobile ski will deflect snow laterally of the ski. The snow deflection member is, of course, positioned on the inboard longitudinal edge of the ski, the latter preferably having a longitudinal secondary running surface on each side of and spaced above a longitudinal primary running surface and the deflection member being positioned on the inboard secondary running surface and having a lower edge spaced slightly above the primary running surface so that this lower edge is not damaged when the snowmobile runs on bare pavement. The deflection member may conveniently comprise a diagonally arranged metal plate, welded or otherwise secured to the underside of the secondary running surface.

From another aspect the invention provides a snowmobile comprising a vehicle body supported on a wide, longitudinally flexible driving track disposed in an endless loop passing over forward driving sprocket means and rear idler sprocket means and defining a lower ground-engaging run and an upper return run, suspension means having elements slidably co-operating with the ground-engaging run of the track to resiliently support the rear portion of the snowmobile thereon, the forward end of the body being supported on a pair of transversely spaced steerable skis positioned outwardly and generally forwardly of said ground engaging run, the improvement comprising a snow deflector member carried on the rear portion of each ski and operative during forward progress of the snowmobile over snow to deflect snow from the path of the ski transversely inwardly of the snowmobile so that at least some of the deflected snow enters between the upper run and the ground-engaging run of the track to lubricate the sliding movement of the track with respect to said suspension elements.

The steerable skis of the snowmobile are mounted outwardly and forwardly of the ground engaging run portion of the endless track, with the snow deflection members mounted on the inboard portion of each respective ski underside. As forward motion of the snowmobile occurs, the snow deflection member causes a portion of the snow on which the snowmobile operates to be deflected sidewardly of the ski. The skis and the snow deflection member are designed such that a portion of the deflected snow enters the suspension system of the snowmobile between the upper and lower ground engaging runs of the endless track whereby lubrication is provided between the track and the slide rails of the suspension system to lengthen the life of the track and slide rails.

BRIEF DESCRIPTION OF THE DRAWINGS

In drawings which illustrate an embodiment of the invention, and by way of example only.

DESCRIPTION OF THE PREFERRED EMBODIMENT

Figure 1:
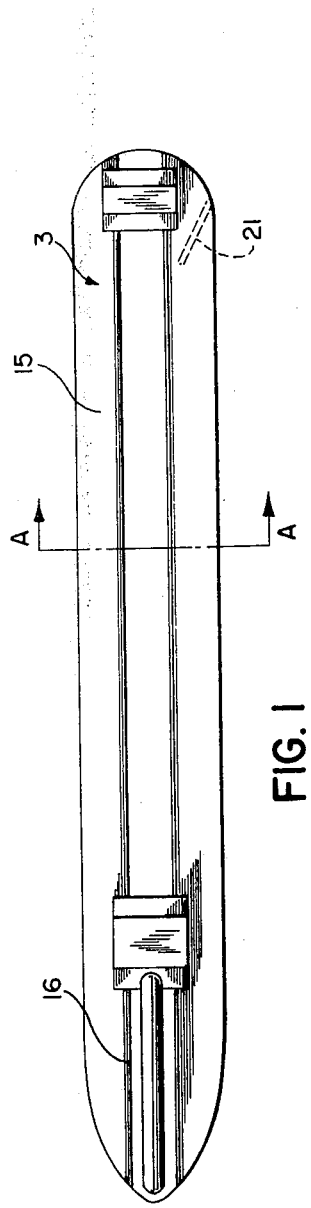
FIG. 1 is a plan view of a snowmobile ski showing a deflection member in broken lines.

A snowmobile is shown generally at 1 (FIGS. 4 and 5) and comprises a pair of forwardly mounted steerable skis 2, 3, and a body portion shown generally at 4 providing mounting means for a suspension system shown generally at 5 (FIG. 5) which supports the body on an endless track 6 in driving engagement at its forward end with a drive sprocket (not shown) and passing over an idler sprocket located at the rearward end of the track.

The suspension system 5 includes a slide frame 8 (FIG. 4) with two slide rails 9, 10 on opposite sides of the endless track 6. The slide rails have lower surfaces of suitable low-friction synthetic material such as nylon and provide, in co-operation with the remaining components of the suspension system, flexible support to the ground-engaging run portion 13 (FIG. 5) of the track 6 which moves longitudinally in contact with and relative to the slide rails 9, 10.

The endless track 6 is usually made from a suitable fabric reinforced material or synthetic rubber material and is provided with laterally extending reinforcing members (not shown) extending throughout its length. The track 6 is driven by drive sprockets (not shown) and passes around idler sprocket 7 at the opposite end, there being openings 32 throughout the length of the belt reinforced by metal cleats which accommodate the teeth of the drive or idler sprockets. The slide rails 9, 10 are spaced apart a distance equal to the distance between the teeth of the drive sprocket and extend parallel to and register with the openings in the endless track such that the cleats, after leaving contact with the drive sprocket, pass into contact with the slides 9, 10 of the slide frame 8 as the track 6 moves rearwardly relative thereto.

Figure 2:
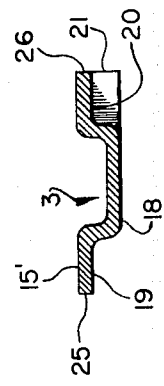
FIG. 2 is a sectional view of the snowmobile ski taken along line A—A of FIG. 1.
Figure 3:
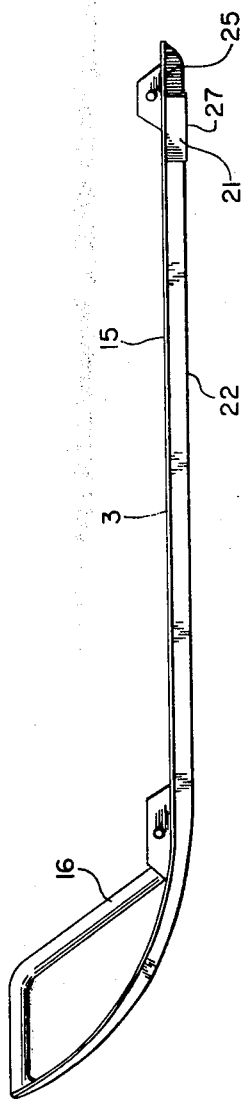
FIG. 3 is a side view of the snowmobile ski and deflection member.
Figure 4:
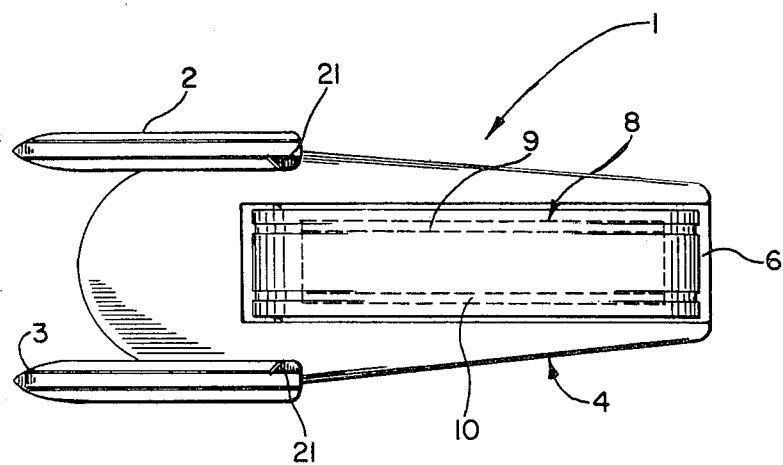
FIG. 4 is an underside view of the snowmobile showing the position of the deflection member with respect to the suspension slide frame.
Figure 5:
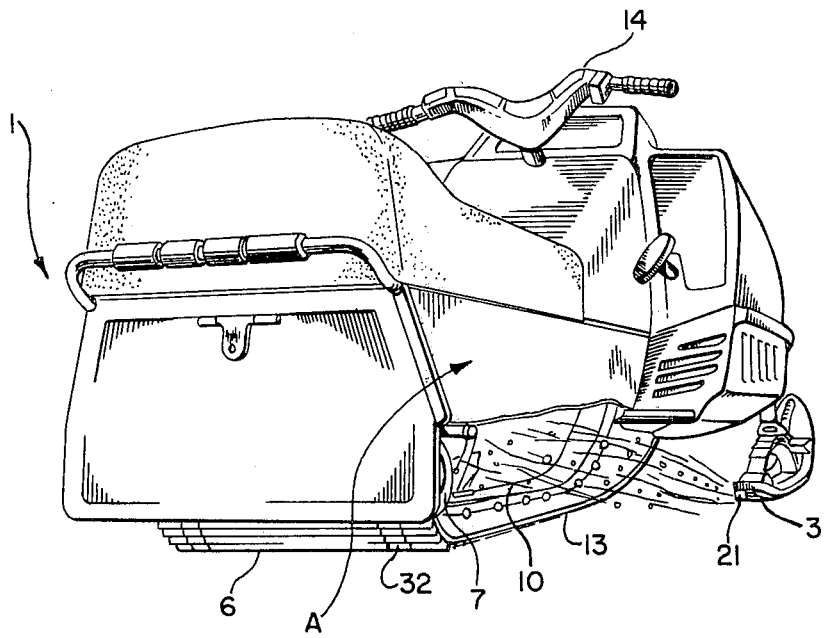
FIG. 5 is a perspective rear view of the snowmobile showing the path taken by the deflected snow.

A pair of steerable skis 2, 3 provides support for the forward portion of the snowmobile and are attached through suitable mechanism to the handle bar 14. Each of the skis 2, 3 comprises an upper surface 15 adapted to be connected to the handle bar 14 of the snowmobile 1 in known manner through a lowered leaf spring (FIG. 5), and which carries a front reinforcing member 16 providing adequate strength to allow shocks to be taken by the front of the ski 3 (FIG. 3). The underside of the ski is provided with a primary running surface 18 (FIG. 2) and two adjacent secondary running surfaces 19, 20, the secondary running surfaces 19, 20 being in raised relationship to the primary running surface 18, and each surface extending laterally outwards from the primary surface to the longitudinal edges 25, 26 of the ski 3. Disposed on the inboard secondary running surface 20, is a snow deflection member 21 comprising a generally rectangular plate with a forward edge portion 22 (FIG. 3) positioned adjacent the primary running surface 18 and a rearward edge portion 23 positioned outwardly and rearwardly of the forward edge portion 22 adjacent the inboard side 25 of the snowmobile ski. The lower edge 27 of the snow deflection member is positioned such that it is above the lowermost portion of the primary running surface 18 in order to avoid direct application of the shock encountered by the skis when the snowmobile operates on ice or temporarily slides across bare ground or pavement. As is seen in FIG. 4, both skis are provided with the snow deflection members on their inboard sides.

In forward operation of the snowmobile, a portion of the snow passing beneath the skis 2 and 3 is deflected sidewardly of the snowmobile 1 (FIG. 5) due to the position of the snow deflection members. This deflected snow is intended to enter the side of the snowmobile between the upper return run and the lower ground engaging run 13 of the endless track 6, and finds its way between the cleats mounted in the openings of the endless track 6 and the slide rails 9, 10, where the major area of friction develops. Thus, the cleats do not directly contact the slides 9, 10 of the slide frame 8 but rather have a layer of snow between them which aids in reducing friction wear and thereby prolongs the life of the slide rails.

While a preferred embodiment of the invention has been described, it is apparent that the invention is capable of modification and variation from the form shown, so that the scope thereof should be limited only by the scope of the claims appended hereto.

What I claim as my invention is:

1. A snowmobile ski with an upper surface adapted to be attached to a steering member and an underside comprising a longitudinal running surface, a snow deflection member positioned adjacent a longitudinal edge of and projecting beneath said underside whereby in operation forward movement of said snowmobile ski will deflect snow laterally of the ski.

2. A snowmobile ski according to claim 1 wherein said underside comprises a longitudinal primary running surface and a secondary running surface located in raised relationship relative thereto and extending to the longitudinal edge of said ski, and a snow deflection member mounted on said secondary surface and projecting downwardly therefrom.

3. A snowmobile ski according to claim 2 wherein said snow deflector member extends outwardly from a forward edge located adjacent said primary surface to a rearward edge adjacent a longitduinal edge of the snowmobile ski.

4. A snowmobile ski according to claim 2 wherein said snow deflection member has a bottom edge located above said primary running surface.

5. A snowmobile ski according to claim 1 wherein said underside comprises a primary running surface extending parallel to the longitudinal axis of the ski and two secondary running surfaces located on either side of said primary surface in raised relationship thereto and extending to the longitudinal edge of said ski, said snow deflection member being located on one of said secondary surfaces and having a lower edge located above said primary surface.

6. A snowmobile according to claim 2 wherein said snow deflection member comprises a generally rectangular plate secured to said underside and projecting beneath the secondary surface.

7. A snowmobile ski according to claim 6 wherein said plate is positioned at an oblique angle relative to the longitudinal axis of said ski.

8. In a snowmobile comprising a vehicle body supported on a wide, longitudinally flexible driving track disposed in an endless loop passing over forward driving sprocket means and rear idler sprocket means and defining a lower ground-engaging run and an upper return run, suspension means having elements slidably co-operating with the ground-engaging run of the track to resiliently support the rear portion of the snowmobile thereon, the forward end of the body being supported on a pair of transversely spaced steerable skis positioned outwardly and generally forwardly of said ground-engaging run, the improvement comprising a snow deflector member carried on the rear portion of each ski and operative during forward progress of the snowmobile over snow to deflect snow from the path of the ski transversely inwardly of the snowmobile so that at least some of the deflected snow enters between the upper run and the ground-engaging run of the track to lubricate the sliding movement of the track with respect to said suspension elements.

9. A snowmobile according to claim 8 wherein said ski includes an underside comprising a longitudinal primary running surface and a secondary running surface located in raised relationship relative thereto and extending to the longitudinal edge of said ski, and a snow deflection member mounted on said secondary running surface and projecting downwardly beneath the inboard longitudinal side of the ski.

10. A snowmobile according to claim 9 wherein said snow deflection member has a bottom edge located above said primary running surface.

11. A snowmobile according to claim 9 wherein said snow deflection member comprises a generally rectangular plate.

12. A snowmobile according to claim 11 wherein said plate is arranged in a vertical disposition at an oblique angle to the length of the ski.

* * * * *